(12) United States Patent
Guzman et al.

(10) Patent No.: US 9,719,259 B2
(45) Date of Patent: Aug. 1, 2017

(54) ARCHITECTURAL TRIM

(71) Applicants: David A. Guzman, Pompano Beach, FL (US); Lionel Guzman, Pompano Beach, FL (US)

(72) Inventors: David A. Guzman, Pompano Beach, FL (US); Lionel Guzman, Pompano Beach, FL (US)

( * ) Notice: Subject to any disclaimer, the term of this patent is extended or adjusted under 35 U.S.C. 154(b) by 0 days.

(21) Appl. No.: 15/207,010

(22) Filed: Jul. 11, 2016

(65) Prior Publication Data

US 2017/0067259 A1 Mar. 9, 2017

Related U.S. Application Data

(63) Continuation-in-part of application No. 14/534,890, filed on Nov. 6, 2014, now Pat. No. 9,388,587.

(51) Int. Cl.
| | |
|---|---|
| *E04C 2/38* | (2006.01) |
| *E04D 13/158* | (2006.01) |
| *E04F 19/02* | (2006.01) |
| *E04F 19/04* | (2006.01) |
| *G05B 19/4097* | (2006.01) |

(52) U.S. Cl.
CPC ............ *E04D 13/158* (2013.01); *E04F 19/02* (2013.01); *E04F 19/024* (2013.01); *E04F 19/0436* (2013.01); *G05B 19/4097* (2013.01)

(58) Field of Classification Search
CPC ......... E04F 19/02; E04F 19/024; E04F 19/04; E04F 19/0436; E04F 10/08; E04F 19/0463; E04F 19/0495; E04F 2019/0422; E04F 2019/0454; E04C 2003/0413; E04D 13/158; A47B 96/202; Y10T 403/559

USPC ............................................. 52/716.1, 653.1
See application file for complete search history.

(56) References Cited

U.S. PATENT DOCUMENTS

| | | | | |
|---|---|---|---|---|
| 2,181,164 A | * | 11/1939 | Alexander | B27H 1/00 156/268 |
| 2,569,916 A | * | 10/1951 | Barnes, Sr. | E04F 19/0436 219/213 |
| 3,117,902 A | * | 1/1964 | Holzheimer | F16L 59/022 138/149 |
| 3,609,927 A | * | 10/1971 | Wine | E04F 19/02 52/100 |
| 3,654,053 A | * | 4/1972 | Toedter | A47B 96/202 229/931 |
| 3,909,995 A | * | 10/1975 | Bainter | E04C 2/296 52/262 |
| 5,001,877 A | * | 3/1991 | Edwards | B44C 5/00 403/295 |
| 5,232,762 A | * | 8/1993 | Ruby | A47B 96/202 138/118 |

(Continued)

*Primary Examiner* — Brian Mattei
(74) *Attorney, Agent, or Firm* — McHale & Slavin, P.A.

(57) ABSTRACT

An improved architectural trim device constructed from cellular polyvinylchloride. The process employs manufacturing dimensionalized cellular PVC architectural components from a single sheet of plastic that can achieve both linear and radius shapes without using heat bending techniques. The process strengthens the cellular PVC, giving it more structural integrity than other products made strictly of cellular PVC. These techniques enable the manufacture of components with tighter tolerances than traditional heat bending techniques which distort the size and shape of the material making accurate and precise assembly difficult.

7 Claims, 12 Drawing Sheets

(56) References Cited

U.S. PATENT DOCUMENTS

| | | | | |
|---|---|---|---|---|
| 6,782,666 B1* | 8/2004 | Condon | ............... | E04D 13/158 |
| | | | | 52/93.2 |
| 6,786,016 B1* | 9/2004 | Wood | ................. | A01M 1/2011 |
| | | | | 43/107 |
| 6,829,862 B1* | 12/2004 | Skulsky | .................... | B44C 5/00 |
| | | | | 52/287.1 |
| 7,897,262 B1* | 3/2011 | Chambers | .............. | E04F 19/02 |
| | | | | 312/114 |
| 2005/0191466 A1* | 9/2005 | Andrade | .................. | B44F 9/02 |
| | | | | 428/167 |
| 2005/0193640 A1* | 9/2005 | Schiedegger | ........... | F24B 1/198 |
| | | | | 52/36.3 |
| 2005/0257464 A1* | 11/2005 | Skulsky | .................... | B44C 5/00 |
| | | | | 52/311.1 |
| 2006/0196144 A1* | 9/2006 | Spek | ........................ | E04B 9/30 |
| | | | | 52/716.1 |
| 2006/0283110 A1* | 12/2006 | Ferguson | ........... | E04F 19/0436 |
| | | | | 52/211 |
| 2007/0020475 A1* | 1/2007 | Prince | ..................... | B05D 1/40 |
| | | | | 428/537.1 |
| 2007/0271865 A1* | 11/2007 | Rowohlt | ............ | E04F 19/0436 |
| | | | | 52/287.1 |
| 2010/0005732 A1* | 1/2010 | Schwartau | ............... | E04B 7/04 |
| | | | | 52/90.1 |
| 2013/0091791 A1* | 4/2013 | Hardy | ................. | E04F 19/0436 |
| | | | | 52/288.1 |
| 2014/0174009 A1* | 6/2014 | Williams | .................. | B60P 3/32 |
| | | | | 52/220.1 |
| 2015/0075094 A1* | 3/2015 | Schucker | ............ | A47G 1/1686 |
| | | | | 52/288.1 |

* cited by examiner

ARCHITECTURAL TRIM

CROSS REFERENCE TO RELATED APPLICATIONS

In accordance with 37 C.F.R. §1.76, a claim of priority is included in an Application Data Sheet filed concurrently herewith. Accordingly, the present invention claims priority as a continuation-in-part of U.S. patent application Ser. No. 14/534,890, entitled "METHOD OF MANUFACTURING ARCHITECTURAL COMPONENTS", filed Nov. 6, 2014. The contents of the above referenced application is incorporated herein by reference in its entirety.

FIELD OF THE INVENTION

The invention is directed to the field of architecture and, in particular, to improved architectural trim components constructed from cellular polyvinylchloride and the method of manufacture.

BACKGROUND OF THE INVENTION

Architectural trim components are traditionally constructed from wood. Unfortunately, wood is susceptible to decay, and the most common wood decay is dry rot. Dry rot is caused by certain fungi which grow when sufficient moisture is present, allowing the fungi to grow and digest the wood, causing the wood to shrink, show a brown discoloration, and crack into pieces. There are many species of fungi that can cause dry rot. For instance, fungus such as *serpula lacrymans, armillaria,* or lignicolous can cause dry rot wood decay. Some fungi secrete an enzyme that breaks down cellulose in wood, which can also lead to discoloration and cracking known as soft rot. These include fungus such as *chaetomium, ceratocystis* and *kretzschmaria deusta* fungi. White rot fungi, common in hardwoods used outdoors, breaks down lignin in wood, leaving lighter colored cellulose behind.

Plastics, including composites made of plastic and wood, have been recognized as a substitute for architectural trim structures. Plastic has weather resistant qualities, can be treated to resist ultraviolet radiation, and has a surface porosity that accepts painting. However, simply substituting plastic for a wood trim structure is not as desirable since plastic possesses poor structural capabilities. Further, a large chunk of plastic creates both a weight and a cost disadvantage. And, while plastic may be a beneficial substitute for small trim components, the trend has been to develop lighter, stronger, and more durable products.

Heating plastic to form curves and bends is well known, but includes the inherent problems caused by the heat changing the structure of the plastic. Fiber reinforced thermoset plastics, such as fiberglass, also provide desirable weather resistant performance qualities, but lack the look and feel of traditional wood trim components. Further, fiber reinforced plastics are difficult to shape, modify, or otherwise work with in the field.

What is lacking in the art are architectural trim components, and the method of constructing them, that can substitute for wood architectural trim components. The components should be constructed of plastic or a composite of plastic and wood, the preferable material being cellular polyvinylchloride, to produce trim components that are light weight, easily manufactured and installed, and are imperious to weather.

SUMMARY OF THE INVENTION

Disclosed is an improved architectural trim and method of manufacturing architectural trim components from plastic or a wood-plastic composite. In the preferred embodiment, a single piece of cellular polyvinylchloride ("PVC") is employed to form a trim component. By way of example, the trim component is drawn on a CAD system to form the cutting steps for left, right and front trim members using guidelines and machining layers. The CAD drawing is preferably imported into an AlphaCAM system with an NC code output directed to a CNC router. The CNC router operates to prepare the trim member, wherein the sides are adjoined to a frontal piece by a living hinge. The living hinge eliminates the need for aligning the sides for assembly. Assembly is with an accelerated PVC adhesive. A reactive resin, filled or unfilled, can be used to fill any gaps between the assembled side and front component. Exposed reactive resin is sanded, and the architectural trim component is then primed for painting. The architectural trim can be painted before or after installation, with the result providing a weather resistant product having superior properties to conventional wood.

The process employs manufacturing dimensionalized cellular PVC architectural trim components from plastic sheets to produce both linear and radius shapes without heating to provide enhanced structural integrity. In lieu of the structural weakening of the plastic caused during heating, the instant process strengthens the structure.

An objective of the invention is to provide a process wherein architectural trim components of varying designs and sizes can go from a design stage to manufacturing in a matter of minutes.

Another objective of the invention is to provide assembled trim components interconnected with a living hinge to provide tight tolerances between side walls and eliminate structural distortion.

Another objective of the invention is to provide a method of creating architectural components that can be repeated quickly and accurately.

Still another objective of the invention is to provide architectural trim components that can be manufactured using materials and techniques that create a product that is weather resistant and will not rot, crack, or warp.

Still another objective of the invention is to provide an architectural trim component formed from a single piece of plastic with prepared hinge lines to eliminate misalignment during assembly.

Yet still another objective of the invention is to provide an architectural trim that is hollow, making it lighter and easier to install versus wood or solid plastic trim.

Another objective of the invention is to provide an architectural trim product that looks the same as traditional architectural trim made from wood, yet eliminates all the problems associated with wood.

Yet still another objective of the invention is to provide an architectural trim product that requires minimal maintenance in even the harshest of climates.

Still another objective of the invention is to provide a process that allows manufacturing of cellular PVC components to create an unlimited combination of shapes and sizes from sheet goods of varying thicknesses.

Other objectives and further advantages and benefits associated with this invention will be apparent to those skilled in the art from the description, examples and claims which follow.

DESCRIPTION OF THE PREFERRED EMBODIMENT

Figure 1:
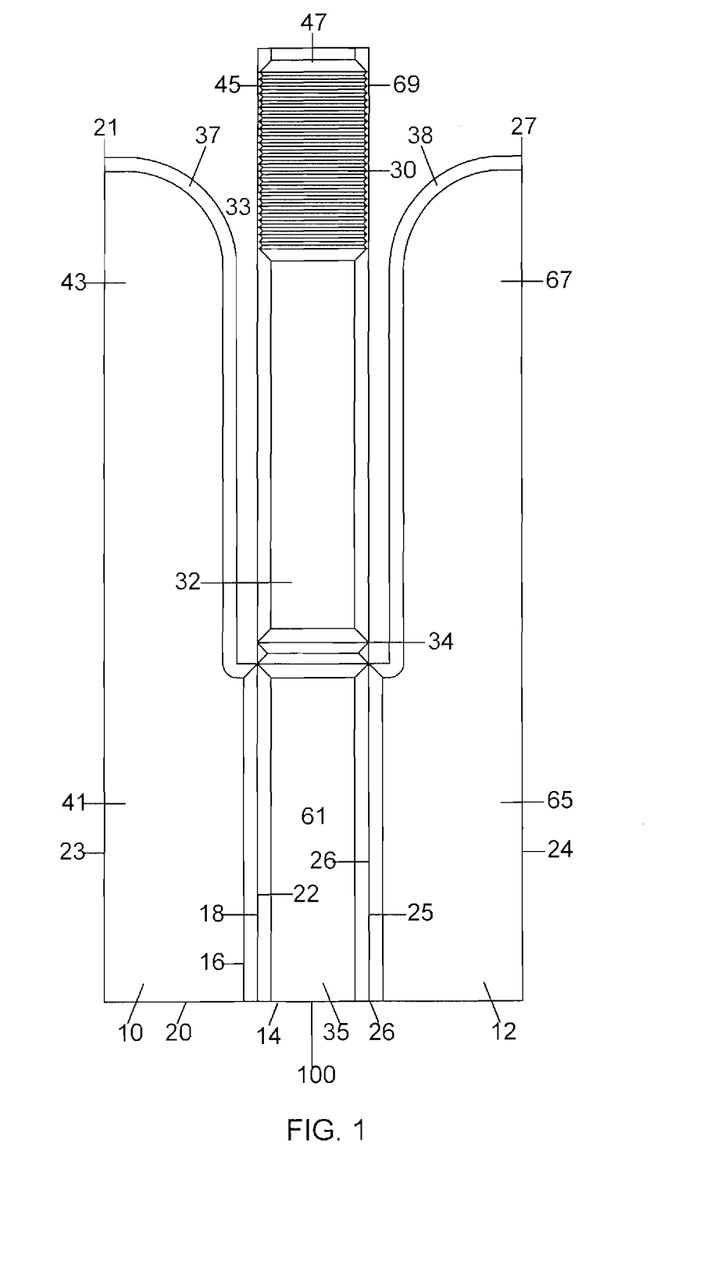
FIG. 1 is a front inside view of a one piece architectural component.
Figure 2:
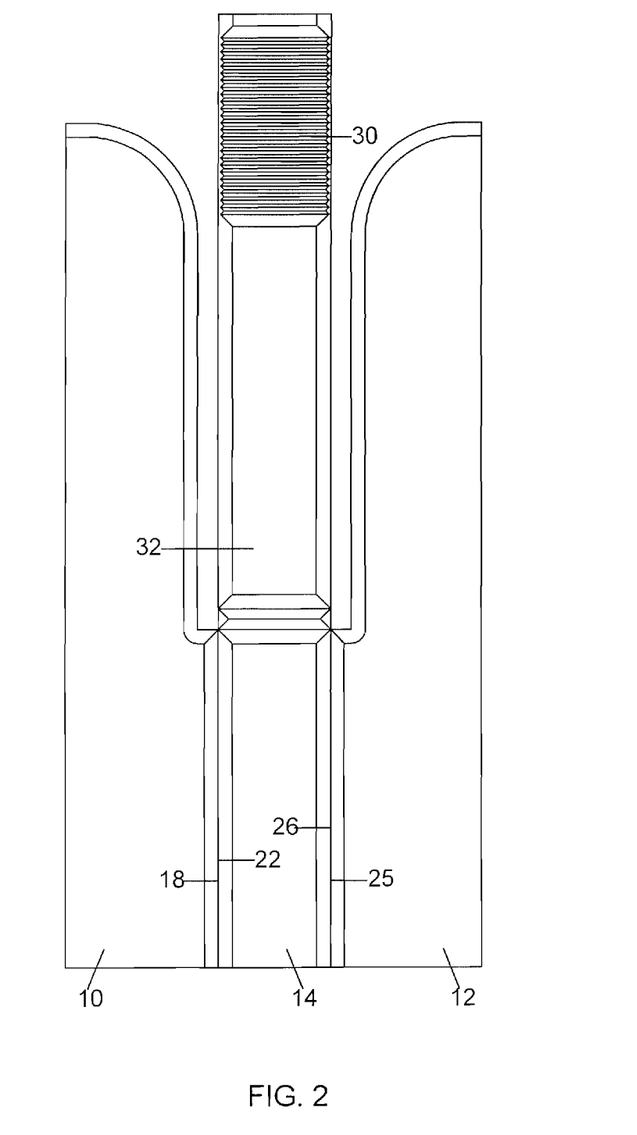
FIG. 2 is a perspective view thereof.
Figure 3:
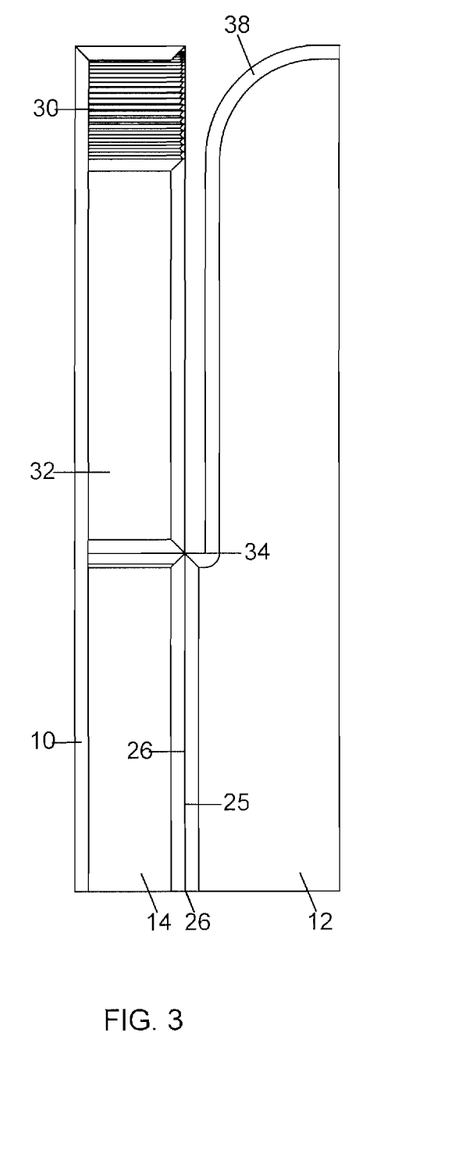
FIG. 3 is the front inside view with a left side of the architectural component folded into position.

Referring to the Figures in general, disclosed is an example of the invention used for architectural trim from cellular polyvinylchloride ("PVC"). One architectural trim component 100 disclosed in the FIGS. 1-6 is a decorative trim component placed beneath a soffit 60 commonly used in early construction and now used to assimilate early construction techniques and appearance. The method of manufacturing such decorative trim components employs a CAD software program for drawing the architectural trim component design, which is then cut from a single PVC sheet. By way of example, the Applicant's trim component 8 has a left side component 10, a right side component 12 forming a mirror image of the left side component 10, and a frontal component 14. The left side component 10 has a substantially uniform wall thickness, and is further defined by a rear edge 16 having a front contoured edge 18 that extends from a proximal end 20 to a distal end 21. A lower portion of the front contoured edge 18 is attached to the frontal component using a living hinge, wherein the contoured edge 18 is constructed and arranged to match a contoured edge 22 of the frontal component, allowing the left component 10 to be folded into a 90 degree position as depicted in FIG. 3. The outer edge 23 is not contoured, and provides a flat surface when folded to allow flush mounting against a house soffit.

Figure 4:
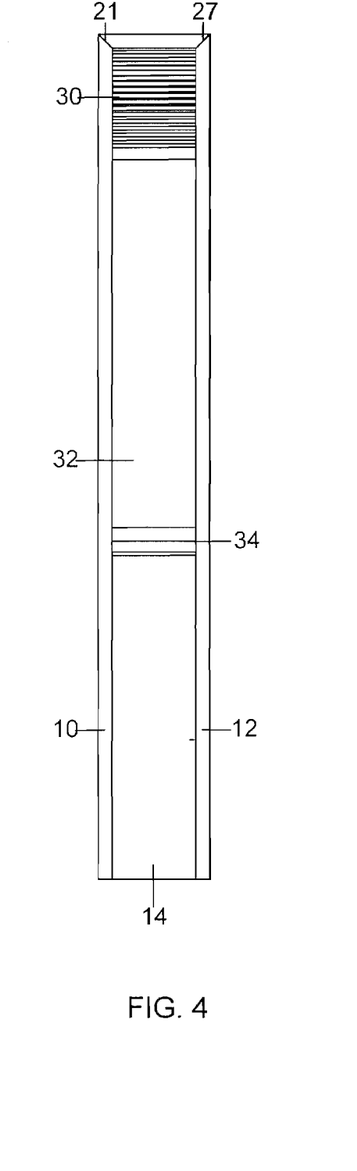
FIG. 4 is the front inside view with the left and right side view folded into position.
Figure 5:
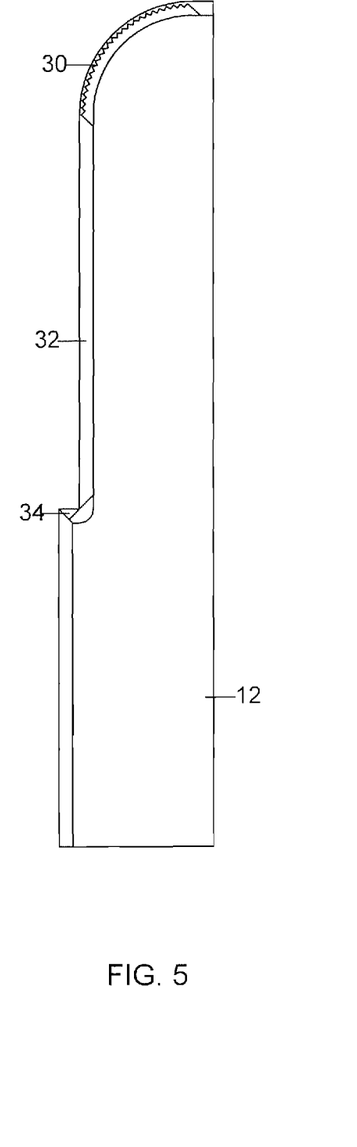
FIG. 5 is the front inside view with the left side, right side, and end pieces placed into position.

Similarly, the right side component 12 has a substantially uniform wall thickness, and the design is defined by a rear edge 24 and a front contoured edge 25 that extends from a proximal end 26 to a distal end 27. A lower portion of the contoured edge 25 is attached to the frontal component 14 using a living hinge, wherein the contoured edge 25 is constructed and arranged to match a contoured edge 26 of the frontal component, allowing the right component to be folded into a 90 degree position as depicted in FIG. 4. The rear edge 24 is not contoured, and provides a flat surface when folded to allow flush mounting against a house soffit.

The frontal component 14 is rectangular shaped having a thickness with the first side edge 22 having a reciprocal angular shape to the contoured edge 18 of the left side component 10, and a second side edge 26 having a reciprocal shape to the contoured edge 25 of the right side component 12. The CAD drawing of the trim component is imported into a CAD/CAM program having a programmed algorithm for applying machining styles to layers along the length of the frontal component 14. In particular, the numerical control output code for operating a CNC router for cutting the trim shapes from a plastic sheet and positioning guidelines includes machine lines 30 that allow for the ease of bending the plastic section around curve. Expansion layer 32 is between a base section 35 and the machine line section 30. The machine lines 30 are cut into and decrease the thickness of the frontal component 14, allowing a portion of the frontal component 14 to bend conjugate along contoured edge 37 of left side 10 and contoured edge 38 of right side 12. The machine lines 30 allow the section to follow the shape of the left and right side curvatures, which may be made of most any curvature design. In addition, a concave reverse cut 34 along expansion section 32 allows convex positioning of the frontal element. The reverse cut 34 allows for a step as further illustrated in FIG. 6. The machine lines 30 are v-shaped cuts into the inner face of the frontal component 14, where decreasing the distance between cuts and increasing the depth of the cuts allows for a smaller curvature radius. This process allows the cellular PVC to bend along a contoured edge without the decrease in structural integrity associated with the heating and bending of plastics.

The frontal component 14 is assembled with the left and right trim components 10, 12 wherein the frontal component 14 bends conjugate to the reciprocal front contoured edges 22, formed on the left and right side of each individual component 10, 12. The frontal component may include a step formed by a reverse cut 34 allowing section 32 to span a large distance followed by a curvature using the machine lines 30 and extending to the distal ends 21 and 27.

Preferably, the components are permanently fastened together using an accelerated PVC adhesive. While proper machining all but eliminates any spacing between components, space that may still exist is permanently filled with a two part epoxy. Once dry, excess epoxy and any uneven corner edge is sanded to form a uniform and seamless corner edge, giving the appearance of a single solid piece of trim. The architectural trim can then be primed and painted. Alternatively, the architectural trim can be primed, mounted to a building structure, and then painted, or mounted and then primed and painted.

The architectural trim 100 is fabricated from a single piece of sheet material 102 with said front member 14 having an inner surface 61 and an outer surface 63 with a thickness therebetween. The front member is further defined by a rectangular shaped rigid base section 35 coupled to a rectangular shaped curvature section 47 by a first living hinge 33. The curvature section 47 is formed from a plurality of ridge shaped machine line cuts 30 placed parallel to each other, allowing the curvature section 47 to bend. The left side member 10 has a first rigid base 41 coupled to a first edge 22 of the rigid base 35 of the front member 14 by a living hinge formed between the frontal member and the left side member. The left side member 10 includes a first curved end 43 extending from the first rigid base 41 to a left side distal tip or end 21; the first curved end 43 including a first beveled surface 37 for receiving a first edge 45 of the front member curvature section 37.

The right side member 12 has a second rigid base 65 coupled to a second edge 26 of the rigid base 35 of the front member 14 by a third living hinge formed between the frontal member and the right side member. The right side member 12 includes a second curved section 67 extending from the first rigid base 65 to a right side distal tip or end 27; the second curved section 67 including a second contoured edge 38 which is formed from a beveled surface for receiving a second edge 69 of the front member curvature section 47. The ridge shaped machine line cuts 30 permits the curvature section 47 to bend conjugate to and interface with the left side member 10 and the right side member 12, which are then held in position with adhesive.

Figure 6:
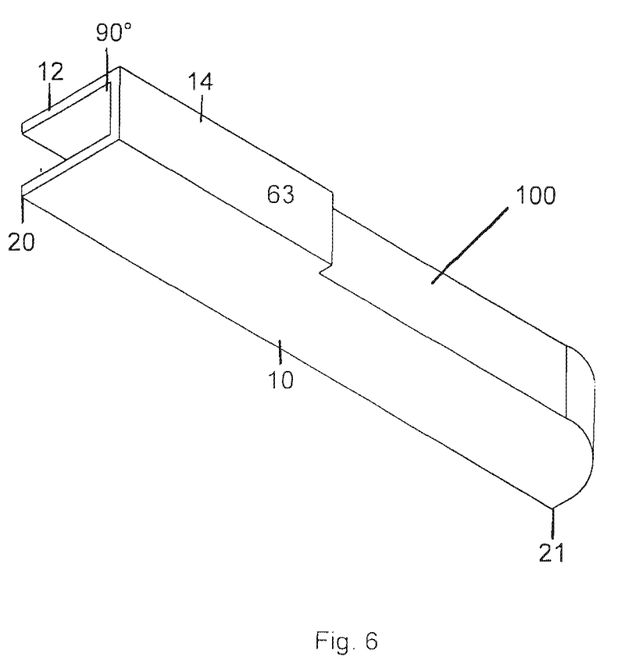
FIG. 6 is a perspective view of the assembled component.

The beveled edges between the left side member and the front member are constructed and arranged to position the two members at a 90 degree angle. Similarly, the right side member and the front member are constructed and arranged to position the two members at a 90 degree angle as depicted in FIG. 6.

Figure 7:
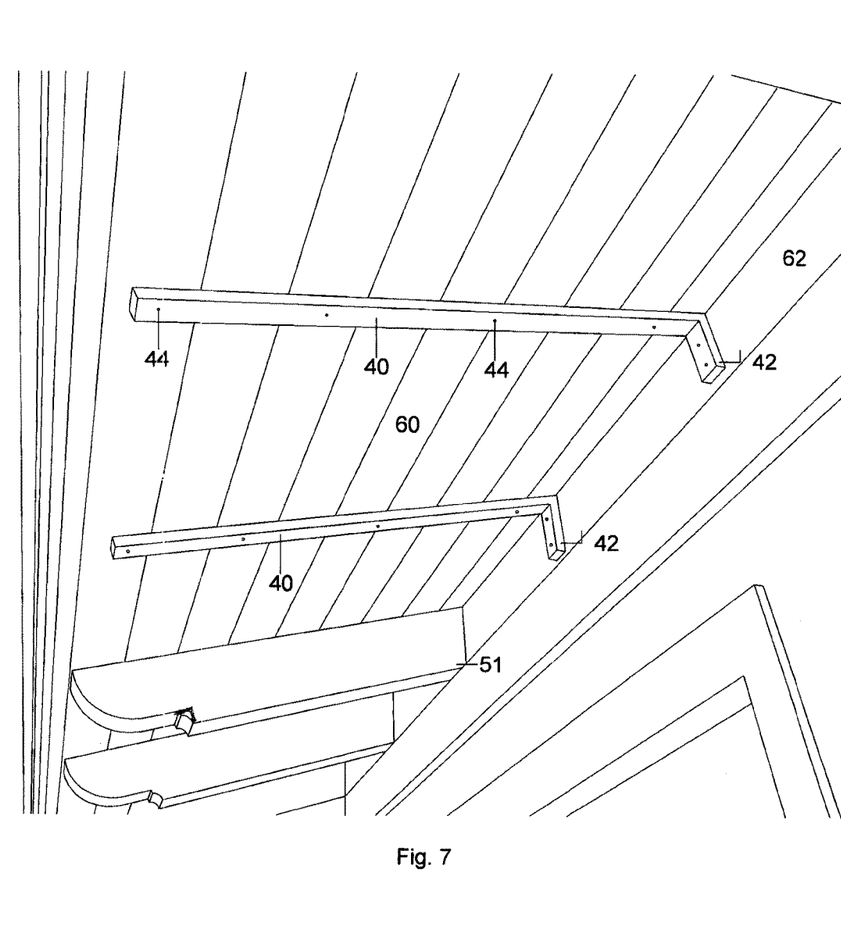
FIG. 7 is a pictorial view of a mounting structure.
Figure 8:
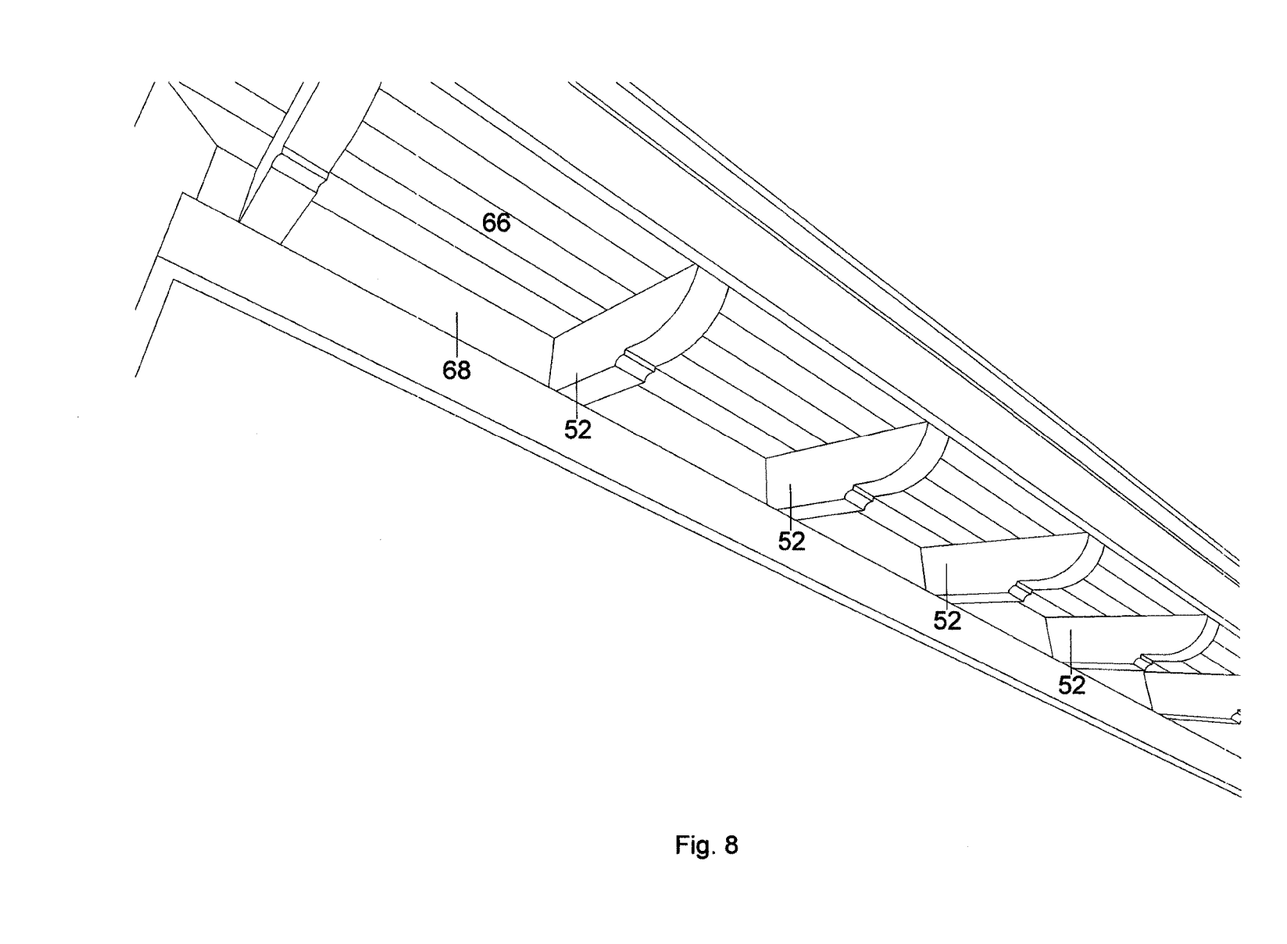
FIG. 8 is a pictorial view of an architectural trim installation.
Figure 9:
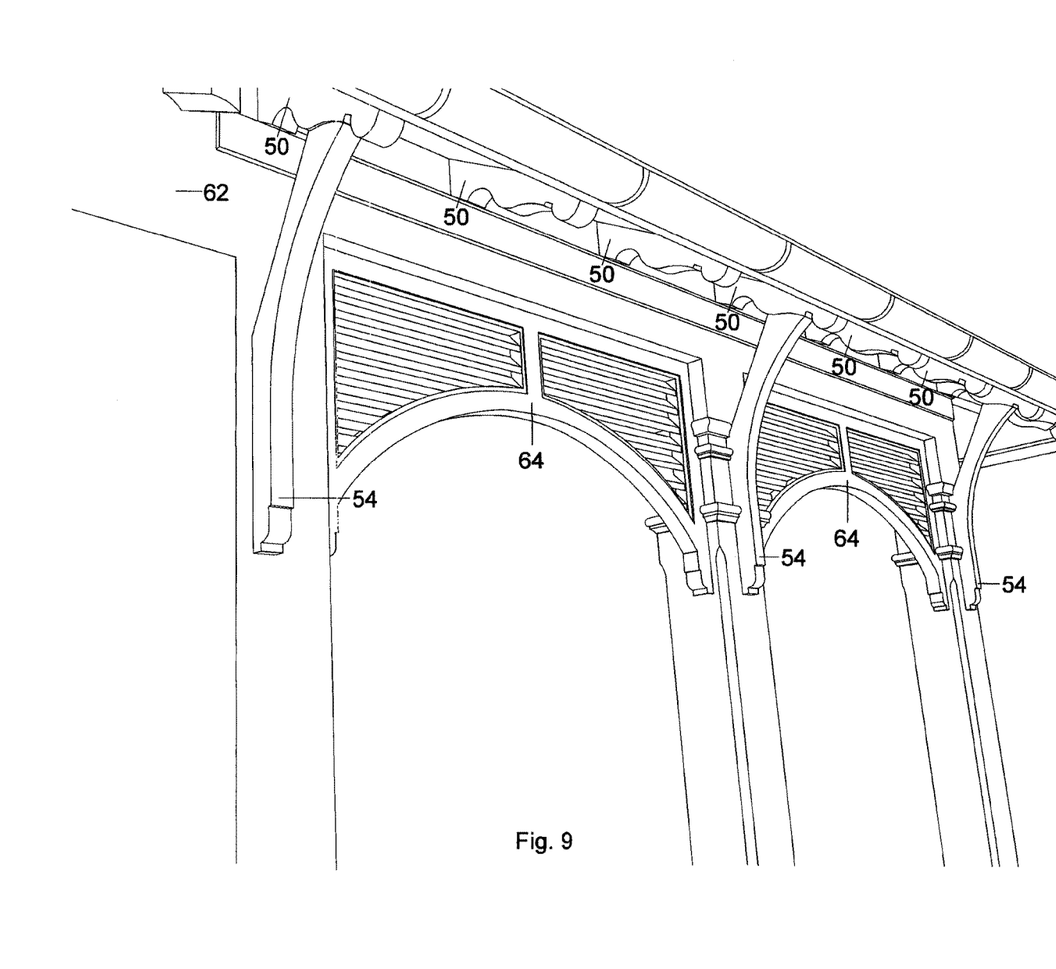
FIG. 9 is a pictorial view of an architectural trim installation.
Figure 10:
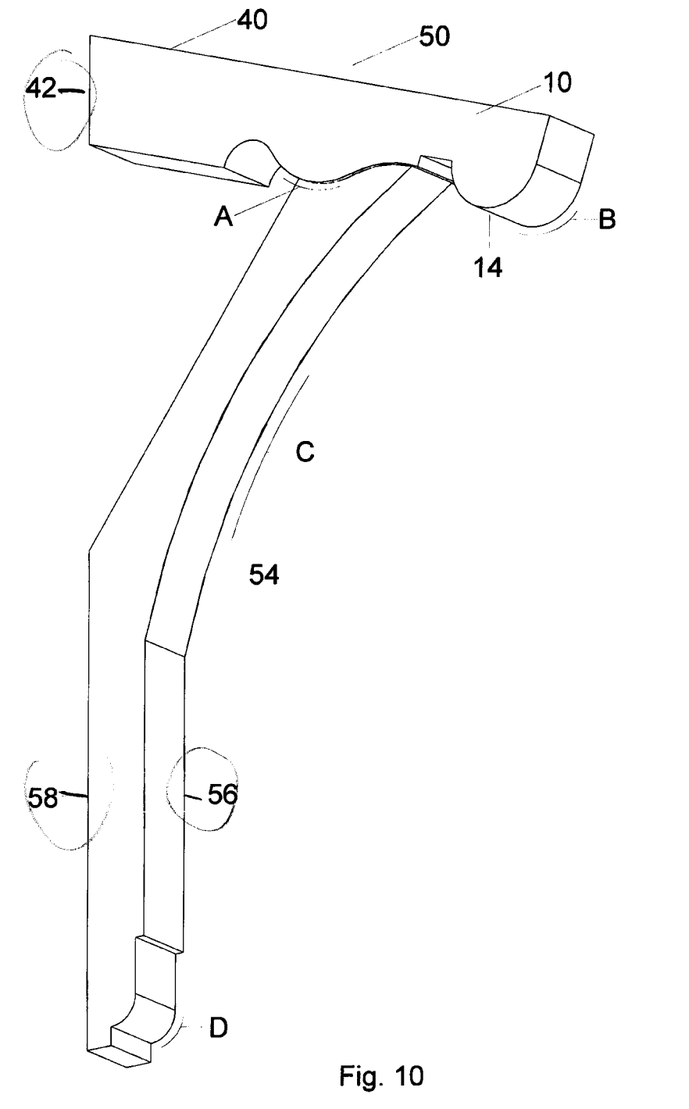
FIG. 10 is a perspective view of two pieces of architectural trim attached together.
Figure 11:
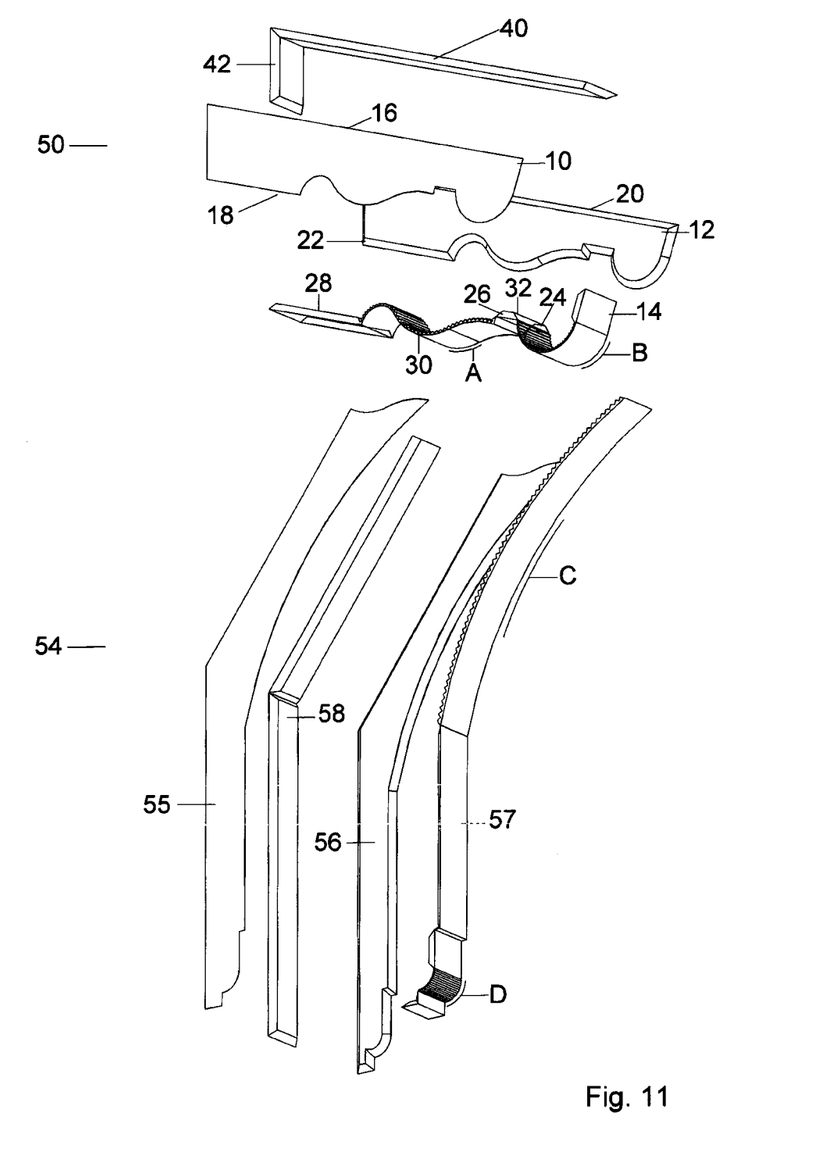
FIG. 11 is an exploded view of the two pieces of architectural trim illustrated in FIG. 10.

FIG. 7 illustrates an installation having a top mounting support 40 securable to soffit 60, and a side mounting support 42 securable to a wall 62 of a building. Preferably, the mounting supports 40 and 42 are made out of the similar PVC material; however, since the mounting supports 40 and 42 will fit within the back surface of the architectural trim and are thereby hidden permanently, other suitable materials may be used. The mounting supports 40 and 42 can be secured to the soffit and wall by conventional fasteners 44 such as screws or nails. Additionally, the mounting supports 40 and 42 can be formed as two separate pieces, or as one piece with a machined v-cut allowing for the angled bend. An architectural trim component 51 can be placed over the mounting supports and fastened by screws, nails or the like. The use of PVC mounting material further provides an option of attaching the architectural trim component 51 by adhesive. As seen in FIG. 8, architectural trim components 52 can be placed in series along a building soffit 66 and abutting frieze board 68, giving the appearance of classical architectural. FIG. 9 illustrates how multiple pieces of architectural trim can be incorporated into the outer wall of a building where the architectural trim of the instant invention provides components 50, 54, and a louver trim component 64. Additionally, as seen in FIGS. 9-11, multiple architectural trim components 50, 54 can be joined together and affixed to the building exterior. This combination of two architectural trim components 50 and 54 can also be seen in FIG. 10, where the components are shown from a rear side angle. FIG. 11 is an exploded view of FIG. 10. Left side component 55, right side component 56, front component 57, and back component 58 of trim component 54 are depicted in this exploded view.

Figure 12:
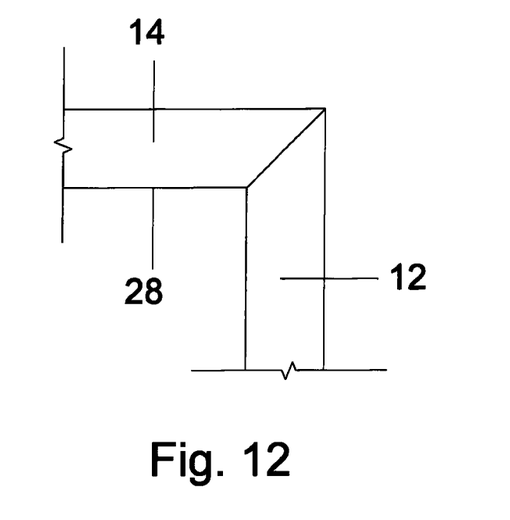
FIG. 12 is a perspective view of the attachment of two components of an architectural trim component.
Figure 13:
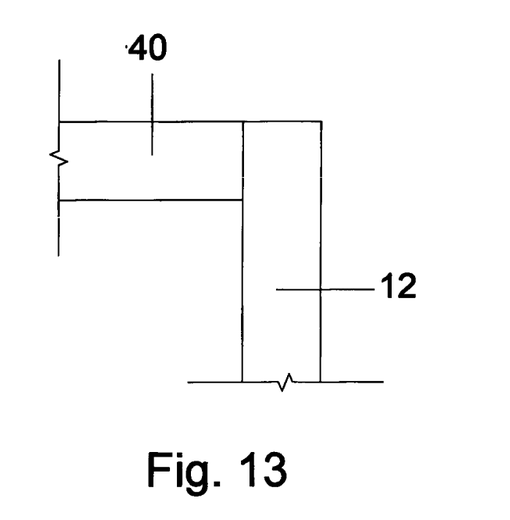
FIG. 13 is a perspective view of an alternative attachment of two components of an architectural trim component.

FIGS. 12-13 show how the pieces of cellular PVC can be adhered together. In FIG. 12, a frontal component 14 and a right side component 12 are shown cut at angles so that the mounting surfaces of each meet at a corner of the architectural trim component 50. FIG. 13 depicts a top mounting support 40 attached to a right side component 12 so that the mounting support is hidden from view when the architectural trim component 50 is mounted to the building exterior. FIGS. 12 and 13 are illustrative and not limiting, as other mounting connections can be used to bond the two pieces of cellular PVC. Tongue-and-groove, lock mitre, and curved edges are examples of other connections which can be used to increase the surface area of mounting surface where the two PVC pieces are joined, where an increase in surface area on the mounting surfaces can increase the strength of the bond between the two components.

The method of forming architectural trim from cellular polyvinylchloride allows for unlimited radius forms, wherein the machining technique eliminates the need for heat bending or laminating. While a detailed embodiment of the instant invention directed to Applicant's Outlook pattern is disclosed herein, it is to be understood that the disclosed embodiments are merely exemplary of the invention, which may be embodied in various forms and include most any radius form. Therefore, specific functional and structural details disclosed herein are not to be interpreted as limiting, but merely as a basis for the claims and as a representation basis for teaching one skilled in the art to variously employ the present invention in virtually any appropriately detailed structure.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. An architectural trim fabricated from a single piece of material, said trim comprising:
    a front member having an inner surface and an outer surface with a thickness therebetween, said front member further defined by a rectangular shaped rigid base section coupled to a rectangular shaped curvature section by a first living hinge, said curvature section formed from a plurality of ridge shaped machine cuts placed parallel to each other allowing said curvature section to bend;
    a left side member having a first rigid base coupled to a first edge of said rigid base of said front member by a second living hinge, said left side member including a first curved end extending from said first rigid base to a left side distal tip, said first curved section including a first beveled surface for receiving a first edge of said front member curvature section;
    a right side member having a second rigid base coupled to a second edge of said rigid base of said front member by a third living hinge, said right side member including a second curved section extending from said first rigid base to a right side distal tip, said second curved section including a second beveled surface for receiving a second edge of said front member curvature section;
    wherein said plurality of ridge shaped machine cuts permits said curvature section of said front member to bend conjugate to and interface with said left side member and said right side member, said members held in position with adhesive.

2. The architectural trim according to claim 1 wherein said material is cellular PVC.

3. The architectural trim according to claim 1 wherein said material is a wood-plastic composite.

4. The architectural trim according to claim 1 wherein said front member includes at least one reverse cut positioned along the inner surface providing a step along the outer surface.

5. The architectural trim according to claim 1 wherein said first edge of said rigid base is beveled and adjoined to said first edge of said left member, whereby said beveled edges form a ninety degree angle when juxtapositioned.

6. The architectural trim according to claim 1 wherein said second edge of said rigid base is beveled and adjoined to said second edge of said right member, whereby said beveled edges form a ninety degree angle when juxtapositioned.

7. The architectural trim according to claim 1 wherein said inner surface of said front member is attached to a mechanical fastener secured to a soffit of a building.

* * * * *